United States Patent [19]
Smith

[11] 3,823,254
[45] July 9, 1974

[54] CABLE SPLICE HOUSING

[75] Inventor: Robert L. Smith, Minnetonka, Minn.

[73] Assignee: Roart Plastics, Inc., Hopkins, Minn.

[22] Filed: June 18, 1973

[21] Appl. No.: 371,189

[52] U.S. Cl.................. 174/92, 174/76, 339/103 R
[51] Int. Cl............................................. H02g 15/08
[58] Field of Search............................. 174/91–93, 174/88 R, 76, 136, 138 F, 84 R; 339/103 R

[56] References Cited
FOREIGN PATENTS OR APPLICATIONS
560,342   3/1944   Great Britain........................ 174/93

907,231   6/1945   France................................ 174/92

Primary Examiner—Darrell L. Clay
Attorney, Agent, or Firm—Leo Gregory

[57]   ABSTRACT

A cable splice housing consisting of a separable housing having end wall openings and a central cavity therein, and an internal annular groove adjacent each end of said housing, each of said grooves having openings through said housing and a clamp member disposed through said openings into each of said grooves for securing a cable therein, said clamp members being secured outwardly of said housing, and a sealant within said housing.

6 Claims, 6 Drawing Figures

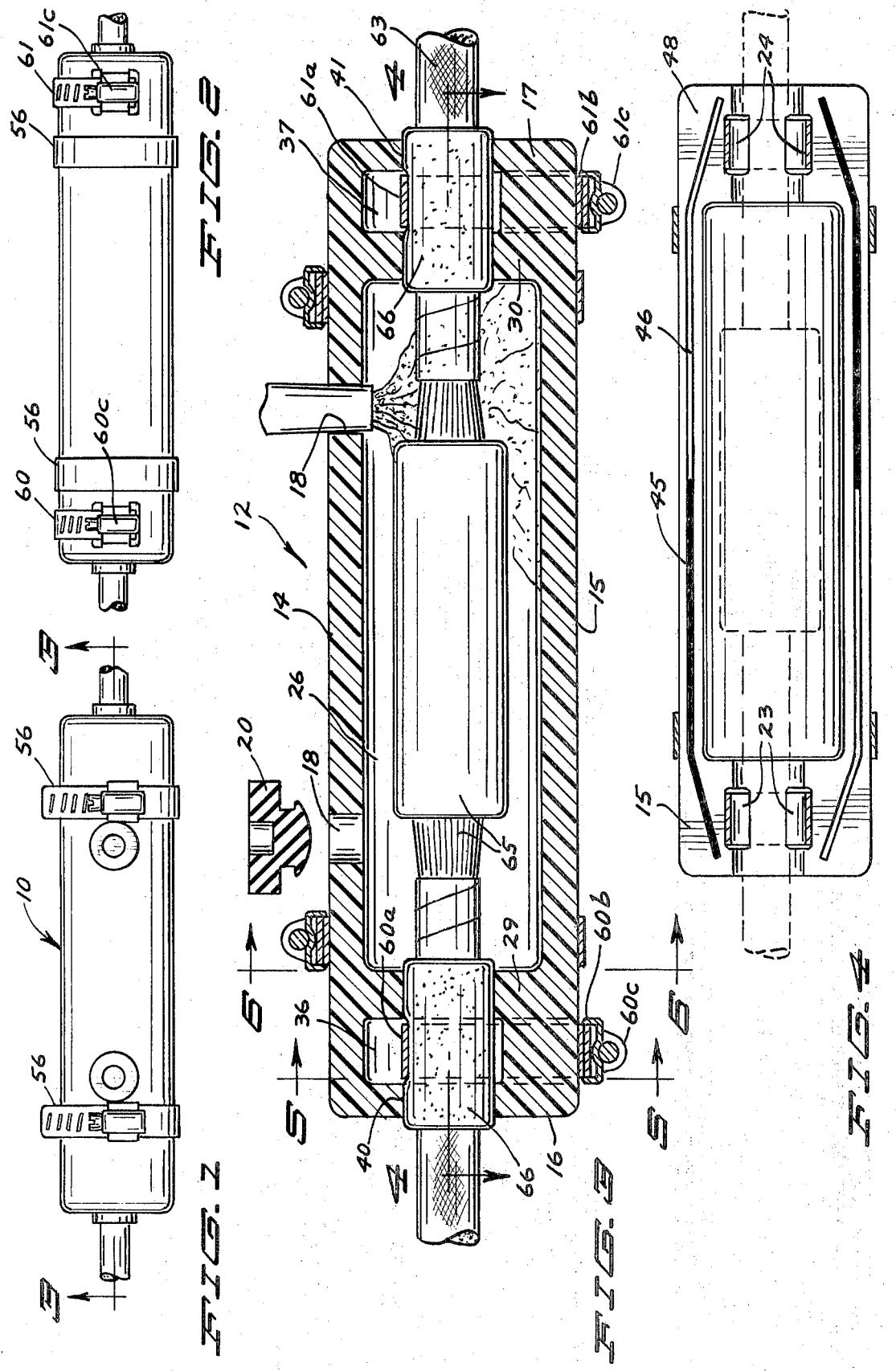

CABLE SPLICE HOUSING

SUMMARY AND BACKGROUND OF THE INVENTION

This invention relates to a device comprising a reentrable cable splice housing with an improvement therein for positively securing said cable within said housing.

Representative of the known art is the disclosure in the U.S. Pat. No. 3,175,032 to R. K. Strauss in which a separable sealed housing encloses a cable splice and a gas is maintained in said housing at greater than atmospheric pressure to prevent the entry of moisture into said housing. In other like structures, a sealant is used to fill the cavity within the housing to protect the cable.

The structure set forth in the invention herein includes in addition to an internal sealant and as a particular improvement, means which positively secures a cable within the housing to hold the splice of the cable free from any strain or pull that may be placed upon the cable. This specific detail of structure represents significant improvement with respect to the known art.

It is an object of this invention, therefore, to provide a housing enclosing a cable splice whereby the splice is free from any external strain or pull which may be placed upon the cable.

It is another object of this invention to provide a cable housing adapted to enclose a cable splice and having means securing said cable splice to an inner wall portion of said housing.

It is a more specific object of this invention to provide a cable housing adapted to receive and enclose a cable splice, said housing having an internal annular groove adjacent each end thereof, a clamp member disposed into each of said grooves having portions to clamp said cable securely against relative movement within said housing.

These and other objects and advantages of the invention will be set forth in the following description made in connection with the accompanying drawings in which like reference characters refer to similar parts throughout the several views and in which:

FIG. 1 is a view in front elevation;

FIG. 2 is a view in rear elevation;

FIG. 3 is a view in horizontal section on an enlarged scale taken on line 3—3 of FIG. 1 as indicated;

FIG. 4 is a view in horizontal section taken on line 4—4 of FIG. 3 as indicated;

DESCRIPTION OF A PREFERRED EMBODIMENT

Figure 5:
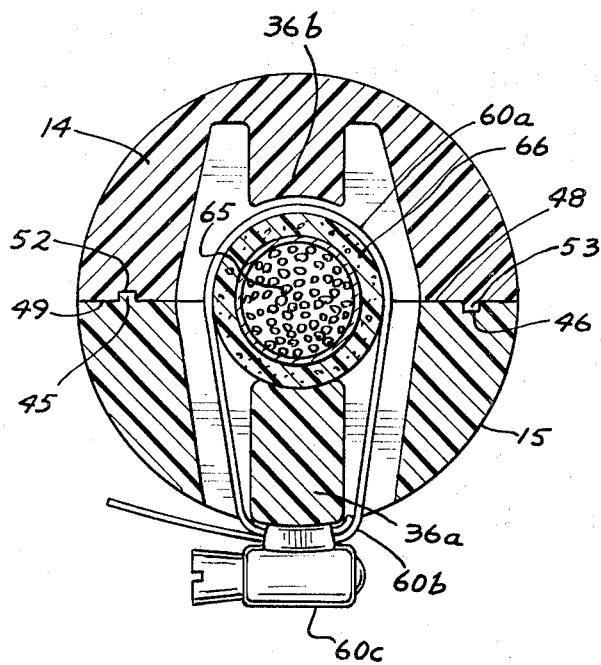
FIG. 5 is a view in vertical section on an enlarged scale taken on line 5—5 of FIG. 3.
Figure 6:
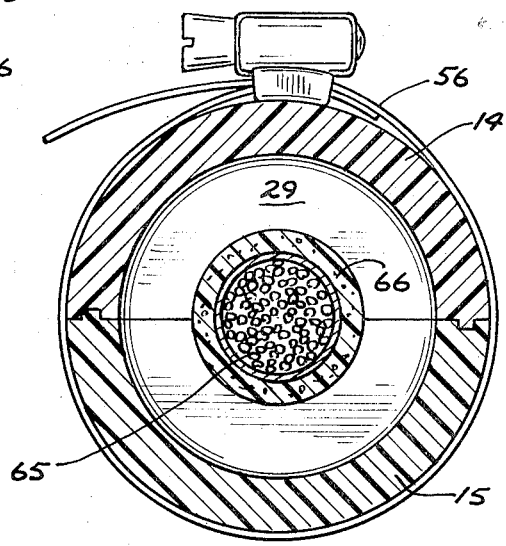
FIG. 6 is a view in vertical section on an enlarged scale taken on line 6—6 of FIG. 3 as indicated.

Referring to the Figures, the device herein indicated generally by the reference number 10 comprises in the present embodiment a cylindrical housing 12 being formed of two like half portions 14 and 15 with said housing having end walls 16 and 17. Said half portion 14 has a pair of spaced apertures 18 as shown into which are inserted resilient sealing plugs 20.

The half portion 15 has a pair of spaced openings 23 and 24 adjacent each end thereof as will be further described.

Referring to FIG. 3, said housing is shown having a central cavity or chamber 26 and having internal end walls 29 and 30 spaced inwardly of the outer end walls 16 and 17 of said housing whereby internal annular grooves 36 and 37 respectively are formed therebetween. Said grooves respectively have radial projections thereinto as shown by the projections 36a and 36b.

Openings 40 and 41 extend inwardly axially of the ends of said housing for communication with said cavity 26.

The portion of the housing 15 as in FIG. 4 is shown having tongues 45 and grooves 46 formed in its surface portion 48 which meets with the corresponding surface portion 49 of the half portion 14 for sealing engagement with the grooves 52 and tongue 53 therein.

The two half portions of the housing are secured together by external strap clamp members 56 adjacent each end thereof.

A particular novel portion of the structure herein consists of said internal annular grooves 36 and 37 and clamp members 60 and 61 which are here shown as strap clamps. Said clamp members 60 and 61 have loop portions 60a and 61a disposed into said grooves as indicated in FIGS. 3 and 5.

In FIG. 3, a cable 63 is shown disposed into and through said housing having a splice portion 65 within said cavity 26.

Enveloping said cable 63 at each opening 40 and 41 is a sealant 66 formed of a suitable mastic compound. Disposed respectively about said cable portions in said grooves 36 and 37 and the mastic sealant thereabout are said loop portions 60a and 61a of said clamp members 60 and 61 with said clamp members having their free end portions 60b and 61b extending outwardly of said openings 23 and 24 to be secured in keepers 60c and 61c. Said clamp members 50, 60 and 61 are of conventional design.

OPERATION

The use of the cable housing is believed to be apparent from the description given.

The housing 12 is separated and the spliced cable is laid across a half portion thereof as shown in FIG. 3. At the time of insertion of the cable into the housing, a mastic sealant is applied to each end of the cable within the internal grooves 36 and 37 and extending throughout the axial end openings 40 and 41. The clamp members 60 and 61 will next be positioned with the loop portions thereof disposed about said cable at each of said grooves 36 and 37 with the free ends of said clamp members being extended through the pairs of openings 23 and 24 of said housing. Said free ends of said clamp members will be received in keepers 60c and 61c as shown in FIG. 5. The strap clamps will be tightened about said cables to secure said cables tightly against the adjacent radial projections into said internal annular grooves as illustrated with the projection 36a in FIG. 5 to hold the splice of the cable free from any external pull or strain being placed thereupon. Hence the cable splice is secured against any movement relative to the housing.

The other half portion of the housing will be positioned with a sealant first being placed over said tongues and grooves 45 and 46 which, as the two halves of the housing are positioned together will provide sealing engagement with the tongues and grooves 52 and 53.

The strap clamps 56 are next placed about the housing adjacent each end thereof and the same are tightened. The sealant plugs 20 are removed and a conventional sealant compound will be injected into said cavity 26 to fill the same. The plugs are next replaced to seal the openings 17 and 18.

The housing in the condition as above described may be then buried as a portion of the cable. Various stresses may be placed upon the cable in its underground position. The strap clamps 60 and 61 holding the cable secure at each end of the housing 12 will hold the spliced portion of the cable freely from such strain, whereby said spliced portion is secure within said housing.

This device has proved to be very successsful in operation.

It will of course be understood that various changes may be made in form, details, arrangement and proportions of the parts without departing from the scope of the invention herein which, generally stated, consists in an apparatus capable of carrying out the objects above set forth, in the parts and combinations of parts disclosed and defined in the appended claims.

What is claimed is:

1. A device encasing a cable splice, having in combination
    an elongated housing,
    a passage extending through said housing receiving cable therethrough and said cable being spliced within said housing,
    an opening into said housing communicating with said passage, and
    a camp member having portions thereof extending through said opening engaging adjacent portions of said cable and securing the same to said housing.

2. A device encasing a cable splice, having incombination
    an elongated housing having end portions,
    a passage extending axially through said housing receiving cable therethrough and said cable being spliced within said housing,
    an internal recess within each end portion of in combination housing in communication with said passage,
    an opening from each of said recesses extending transversely through said housing, and
    clamp members respectively having portions thereof disposed into each of said recesses engaging said cable extending through said passage and securing the same to said housing.

3. The structure set forth in claim 2, wherein
    said recess within each end portion of said housing comprises an annular groove.

4. The structure set forth in claim 3, wherein
    a radial projection extends into each of said annular grooves, and
    wherein said clamp members secure said cable engaged thereby against said radial projections.

5. A device encasing a cable splice, having in combination
    an elongated housing having end portions,
    a passage extending through said housing receiving cable therethrough and said cable being spliced within said housing,
    an opening adjacent each end of said passage extending transversely into said housing,
    an internal annular groove adjacent each end portion of said housing, said openings communicating with said grooves, and
    clamp members respectively having portions thereof disposed through each of said openings into said housing engaging said cable extending through said passage and securing the same to said housing.

6. The structure set forth in claim 5, including
    a radial projection extending into each of said annular grooves, and
    wherein said clamp members secure said engaged cable against said radial projections.

* * * * *